(12) United States Patent
Carris et al.

(10) Patent No.: US 6,629,542 B2
(45) Date of Patent: Oct. 7, 2003

(54) RAPID INSTALLATION MOBILE WATER MODIFYING SYSTEM AND RELATED METHODS

(75) Inventors: Steve Carris, Mt. Holly, NC (US); Roy Nelson, Pisgah, AL (US)

(73) Assignee: C & R Builders, Belmont, NC (US)

( * ) Notice: Subject to any disclaimer, the term of this patent is extended or adjusted under 35 U.S.C. 154(b) by 112 days.

(21) Appl. No.: 10/043,455

(22) Filed: Jan. 10, 2002

(65) Prior Publication Data

US 2003/0127145 A1 Jul. 10, 2003

(51) Int. Cl.[7] .......................... E03B 11/02; E03B 11/10
(52) U.S. Cl. .................. 137/1; 137/899; 137/565.01; 137/572
(58) Field of Search .................. 137/899, 1, 565.01, 137/572

(56) References Cited

U.S. PATENT DOCUMENTS

| 4,272,967 A | | 6/1981 | White et al. |
| 4,691,687 A | | 9/1987 | Mutchler |
| 5,181,655 A | | 1/1993 | Bruckelmyer |
| 5,240,043 A | * | 8/1993 | Campbell .................. 137/899 |
| 5,547,584 A | | 8/1996 | Capehart |
| 5,570,685 A | | 11/1996 | Turiello |
| 5,669,982 A | | 9/1997 | Latimer |
| 5,893,341 A | | 4/1999 | Cox |
| 5,950,662 A | | 9/1999 | Scott |
| 5,964,402 A | | 10/1999 | Jakobson |
| 6,126,081 A | | 10/2000 | Calvin et al. |
| 6,349,733 B1 | * | 2/2002 | Smith .................. 137/899 X |

* cited by examiner

Primary Examiner—Kevin Lee
(74) Attorney, Agent, or Firm—Allen, Dyer, Doppelt, Milbrath & Gilchrist, P.A.

(57) ABSTRACT

A mobile water modifying system adapted to be readily interposed into a water pipe structure or network extending between a preconstructed facility and an external water supply is provided. The system can receive water from the water supply, modify the water, and transfer the modified water to the facility. The system includes a plurality of valved connectors to connect to the water pipe structure and control water pressure as the system is interposed into the water pipe structure or network. Different modes of water modification can be effected by incorporating different types of water modifiers in the system. These water modifications include heating water, cooling water and treating water to remove organic and non-organic contaminants. Methods also are provided for correcting an interruption in the supply of usable water to a facility and for avoiding such interruptions during repair or replacement at the facility.

37 Claims, 10 Drawing Sheets

RAPID INSTALLATION MOBILE WATER MODIFYING SYSTEM AND RELATED METHODS

FIELD OF THE INVENTION

The present invention relates to the field of water systems and, more particularly, to the maintenance of water systems, modifying water within such systems, and related methods.

BACKGROUND OF THE INVENTION

The habitability of any commercial or residential facility depends critically on maintaining an adequate supply of water to the facility. Such facilities generally require a continuous supply of clean water that runs both hot and cold according to the demands of individual users. An interruption in the supply of water can pose a tremendous hardship even in a single-family home. In the context of a facility such as an office building or hotel, however, the problems arising from an interruption in the water supply are compounded significantly. With respect to an office building, an interruption in the supply of water to the facility can force a temporary closing of the facility resulting in unexpected costs and delays in the operation of the businesses of the facility's occupants. The problem can be even more severe for a hotel or motel. Not only will the facility have to turn away any new guests until the interruption is cured, but more troubling, the interruption is likely to sorely test the patience of those already staying in the facility. The real harm, is not so much the irrate reaction of those occupants having to go without water, as it is the denigration of the reputation of the entity or chain running the facility. In stark terms, the weary traveler who has checked into a hotel or motel after a long day of travel only to have to go without hot running water is unlikely to stay again at that hotel or motel or any other associated with it.

In general, facilities such as office buildings, apartment buildings, hotels and motels rely on an external source for their supply of water. These facilities, however, usually rely on their own water heaters to heat the water received. If there is a breakdown or failure of a facility's water heater, the facility is left without any means for heating water even though water can still be obtained from the external source. Thus, notwithstanding a ready supply of water, the facility will be without hot running water until the water heater can be prepared. If the water heater must be replaced, or if repair must await the arrival of a critical component, the facility will be without hot running water for a prolonged period of time. In the interim, there is little that a building, apartment, hotel or motel manager can do except endure the complaints of occupants forced to do without hot water. An even more troubling scenario would occur if the external source became contaminated with bacteria or was beset by some other problem requiring treatment of the water before it could be used. Because most facilities do not have their own water treatment capabilities, the occupants of the facility would, as in the case of a broken water heater, simply have to go without water until such time as the water from the source could be cured of any defect. Again, even though the facility would have access to a supply of water the occupants would for all intents and purposes be without water until such time as the water could be treated.

Supplemental water supplies suggested for use in various other contexts are of little or no value in addressing the problem of interruption of the water supply to a facility such as an office building, apartment, hotel, or motel. Even with respect to a single-family facility, conventional methods are likely in many cases to be inadequate to deal with such mishaps as a breakdown in the facility's water heater or deterioration in the condition of the water obtained from an external source. U.S. Pat. No. 5,950,662 to Scott titled Supplemental Water Supply, for example, discloses mobile delivery of purified water to a residential dwelling with a conventional tap water system. The intended purpose is to provide dwellers an alternative to the undesirable tastes and smells of tap water. The quantity of water deliverable with such a tank truck, however, is clearly insufficient to meet the demands of a multiple unit facility such as an office building, apartment, hotel, or motel. Even for a single-family dwelling experiencing an extended interruption in the supply of water from an external source, intermittent deliveries of water with a system such as the one disclosed by Scott would likely be cost prohibitive depending on how prolonged the interruption were to last.

U.S. Pat. No. 5,893,341 to Cox titled Mobile Pool Heating Apparatus, for example, discloses heating he water in a swimming pool, hot tub, or similar facility using a temporary water heater that is transported by a truck that also carries a water pump. As with a system such as the one disclosed in Scott, however, the system described in Cox is ill-suited for dealing with an interruption in the water supplied to a facility from an external source. To be operative, this type of system requires a readily available on-site source of water to heat. For a facility that is supplied by an external water source, however, there will be no on-site water source to utilize. Moreover, this type of system does not provide any mechanism for maintaining a continuous, controlled flow of modified water as would be required for a facility such as an office building, hotel, motel or even a residential dwelling. With a system such as the one disclosed by Cox, the water simply flows from the pool through a heater and back to the pool. U.S. Pat. No. 5,547,584 to Capehart titled Transportable, Self-Contained Water Purification System and Method discloses purifying water using a water purifier that can be towed to a remote site, but which, as with the system disclosed by Cox, requires ready access to an available water supply at the site. Moreover, as with all such systems, there is no ability to provide a continuous, controlled supply of water from a source removed from the site.

These and other conventional systems and devices do not provide a rapid and efficient means for overcoming an interruption in the supply of water to a facility that results whenever a facility water heater or a source filtering unit breaks down or the water becomes otherwise unusable. Conventional systems and devices require at least an open, on-site water source (e.g., a pool) from which to draw water. Otherwise, the water must be transported to the site for treatment. These systems, moreover, lack the capability to quickly replace a water system at a facility or provide a continuous, large volume supply of water to the facility. There remains, therefore, a need for a system that in rapid response to an interruption in the supply of water to a facility can access an external source of water—even one far removed from the facility—and quickly heat, filter, or otherwise modify the water so that it can be provided to the facility.

SUMMARY OF THE INVENTION

In view of the foregoing background, the present invention advantageously provides a system and methods for rapidly and efficiently remedying an interruption in the supply of water to a facility. Specifically, the present invention provides a system that quickly and efficiently connects to any pipe structure extending between the facility and an external source, diverts the water from the external source to a water modifier, modifies the water, and then distributes the water to the facility. This ensures that any interruption in the supply of water to the facility will be minimized. An interrupted supply of water to a facility can be resumed in only the time needed to transport the system to a point of access to the pipe structure, connect to the pipe system, and modify the first units of water. Moreover, by readily connecting to the pipe structure extending between the facility and the external source, the system obviates the need for an on-site source of water or, alternatively, the time and expense of transporting water to the site of the facility. This capability is particularly advantageous in the context of responding to an interruption in the water supply to a high-use facility such as an office building, apartment complex, hotel, motel, or restaurant where a large amount of water must be supplied on a virtually continuous basis.

Relatedly, the system provides a valuable adjunct to conventional water system repair operations. Specifically, when the facility must be taken off-line so as to permit the repair or replacement of a water heater, for example, the system can respond by diverting water from the external source to the system so that water from the source can be rapidly heated and supplied to the facility. The facility water heater thus can be repaired or replaced virtually without interruption in the supply of hot water to the facility.

The present invention, more particularly, provides a mobile water modifying system that is adapted to be quickly and efficiently interconnected to the plumbing or pipe structure extending between a facility and a water source (e.g., water plant) so that water can be diverted from the source to a water modifier for modification before it is supplied to the facility. The system preferably includes a water modifier positioned on a mobile platform. Preferably the water modifier includes a fluid chamber having an inlet through which water is received and an outlet through which water is conveyed. More preferably, the water modifier includes a plurality of such chambers in fluid communication with a separate water processor. This arrangement facilitates rapid and efficient water modification by permitting water to be rapidly supplied from the source into a chamber, then transferred to the water processor for modification, and transferred anew to a fluid chamber for continuous, controlled supply to the facility. More specifically, water can be treated or modified (e.g., heated or purified) and transferred to a fluid chamber so that it is available on-demand by a water user at the facility. Simultaneously, the system can be modifying more water, while at least one chamber holds additional water to be supplied on-demand to the facility. Thus, the system provides a kind of water processing assembly line using the plurality of chambers and associated water processor.

A pump can be included in the system to transfer water between the water processor and respective fluid chambers. More generally, however, the system can rely on the water pressure supplied by the external source (e.g., water plant) and associated plumbing or pipe structure to facilitate the movement of water between the source, system, and facility.

The water processor itself can be a water heating or cooling unit or any type of water treatment device (e.g., filter). Preferably, theses various types of processors are interchangeable. Thus, according to the present invention, the system can be adapted to respond to different kinds of interruptions in the water supply to a facility. For example, if there is a breakdown of the water heater at the facility, a water heater can be mounted on the mobile platform along with a plurality of fluid chambers. If a water supply interruption occurs as a result of a problem of a different nature, the water processor can be changed so as to accommodate the particular need. For example, if a chemical or bacterial agent were found at the source, then rather than shut down the facility, the source water could be diverted to the mobile system on which a water filter had been mounted to purify the water for use at the facility.

As alluded to above, a further advantage provided by the present invention pertains to the capability to easily and efficiently access a water source external to the facility by connecting to the plumbing or pipe structure extending between the source and the facility. Preferably, the mobile system connects to the external source by identifying a location along the pipe structure between the facility and the source, removing a section of pipe, and installing a connector. For example, if there is a breakdown in a facility's water heater, then a connector would be interposed into the water network by connecting to the cold and water lines independently in the following manner: first, flow of water along the lines is cut off, sections of the lines are cut out, and then, at each removed section, a connector is installed. Each connector preferably includes an in-line hollow portion having opposing open ends that connect, respectively, to the two open portions of pipe formed by removing a section.

More preferably, each such connector also includes a hollow cross-line portion in fluid communication with the in-line portion and extending outwardly therefrom in a direction substantially perpendicular to the longitudinal direction of the in-line portion. The end of the cross-line portion of each connector, moreover, is open and adapted to connect to a tube. More preferably, one or more valves are positioned substantially at the respective ends of the in-line portion and at the end of the cross-line portion to thereby define a connector having three fluid direction control valves: an in-line inlet valve, a in-line outlet valve, and a cross-line outlet valve. The plurality of valves on each connector permit optimal control of the water flow so as to accommodate water pressure levels.

The present invention provides methods for providing modified water on an emergency or temporary basis. According to the present invention, water supplied to a preconstructed facility from an external water supply can be modified by interconnecting a water modifier to a water pipe structure linking the preconstructed facility to the external water supply. Water is then diverted from the water supply to the water modifier. The water so diverted is modified and then conveyed to the preconstructed facility. Moreover, the present invention also provides an efficient method of repairing a preconstructed facility water modifier. This method entails diverting water from an external water supply to a temporary water modifier and modifying the water so diverted from the water supply using the temporary water modifier. The water, once modified, is then conveyed to the preconstructed facility. While water is being diverted, the preconstructed facility water modifier can be repaired or replaced as needed.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 1:
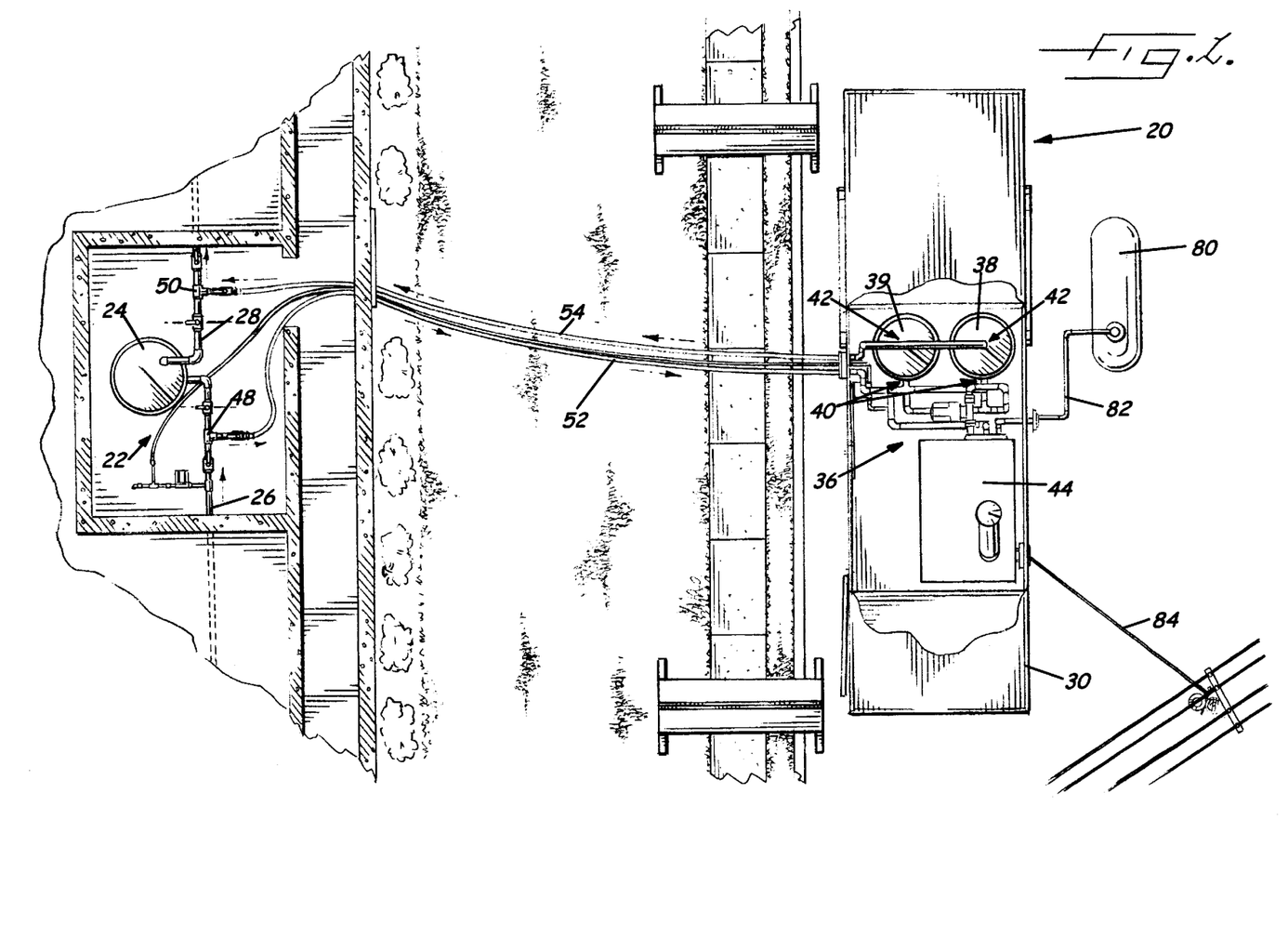
FIG. 1 is an environmental view of a mobile water modifying system having portions broken away for clarity in illustrating a water modifier, pump, and a plurality of fluid chambers connected to portions of a pipe structure to divert water from a water source to thereby modify the water and supply the water to a facility according to the present invention.

FIG. 1 illustrates a mobile water modifying system 20 for heating, cooling, filtering, or otherwise modifying water according to the present invention. The system 20 can be interposed into a preexisting water network 22 made up, usually, of water lines or pipes carrying water to users throughout a facility such as an office building, hotel, motel, or residential dwelling. As will be clear from the ensuing discussion, the system provides particular advantages for commercial facilities such as office buildings, apartment complexes, hotels, motels, and restaurants wherein large numbers of water users necessitate a virtually constant supply of clean hot and cold running water. Indeed, the advantages are especially pertinent with respect to hotels, motels, and restaurants where any interruption in the supply of water can pose a serious handicap on the operation of the facility and generate tremendous inconvenience for customers and patrons—inconvenience which is likely to leave a lasting negative impression on customers.

Once interposed into the water network 22, the system 20 can obtain water from an external source, modify the water in a preselected manner, and supply the modified water to water users within the facility. The external water supply, as will be readily understood by those skilled in the art, can be a public water source (e.g., municipal water plant or aquifer), a private water system, or a below-ground water well. The network of water lines or pipes 22 that the system 20 can be interposed into includes the various pipes comprising the plumbing of a facility, a water line extending from the facility to a main line connected to the external water supply, as well as a main water line itself.

The system 20 is capable of performing a variety of water modifying functions depending on the nature and function of the water modifier 36 (described below) utilized in the system 20. Preferably, the system can be adapted to perform water cooling, water decontamination, water filtering, and even water softening on a temporary, emergency basis. More preferably, the system 20 provides a temporary supply of hot water to a facility experiencing a breakdown of its on-site water heater 24. As described in detail below, the system 20 in such situations is connected to water lines, including at least a first main line 26, preferably a cold water line, that carries water from an external source to the facility's in-place water modifier, preferably a facility water heater. The water lines further include at least a second water line 28, preferably a hot water line, that normally carries water from the facility's in-place water modifier (e.g., facility water heater). The system 20 diverts water from the facility water modifier (e.g., facility water heater) 24, modifies the water (e.g., heats the water), and supplies it on demand to users situated at or in the facility. Although water is being diverted from the facility's in-place water modifier (e.g., water heater) 24, the facility modifier (e.g., water heater) is off-line and can be easily repaired or replaced. During the repair or replacement, the system 20 continues to supply modified water (e.g., heated water) to the facility thereby avoiding any interruption in the normal operations of the facility or inconvenience to water users in the facility. Once the facility's in-place modifier (e.g., water heater) 24 is repaired or replaced, the system 20 can be removed from the site and made available for transportation to a new facility as needed. In this manner, the system can perform various water modification functions, including heating water, cooling water, or treating water to remove or eliminate organic and non-organic contaminants in water to be supplied to the facility on a temporary or emergency basis.

Figure 2:
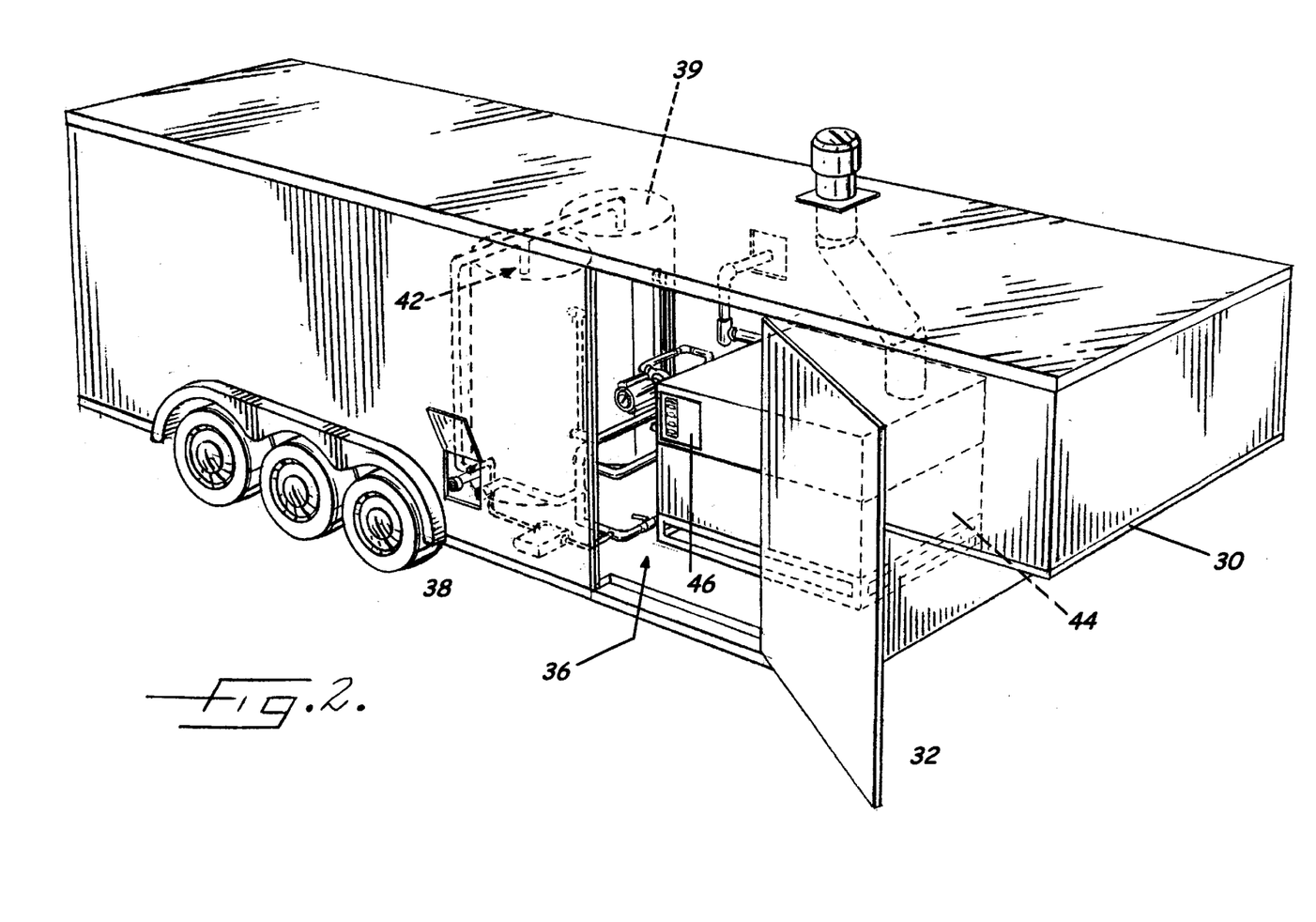
FIG. 2 is a perspective view of a mobile water modifying system having two fluid chambers, pump, and water modifier mounted in an enclosed mobile platform according to the present invention.
Figure 3:
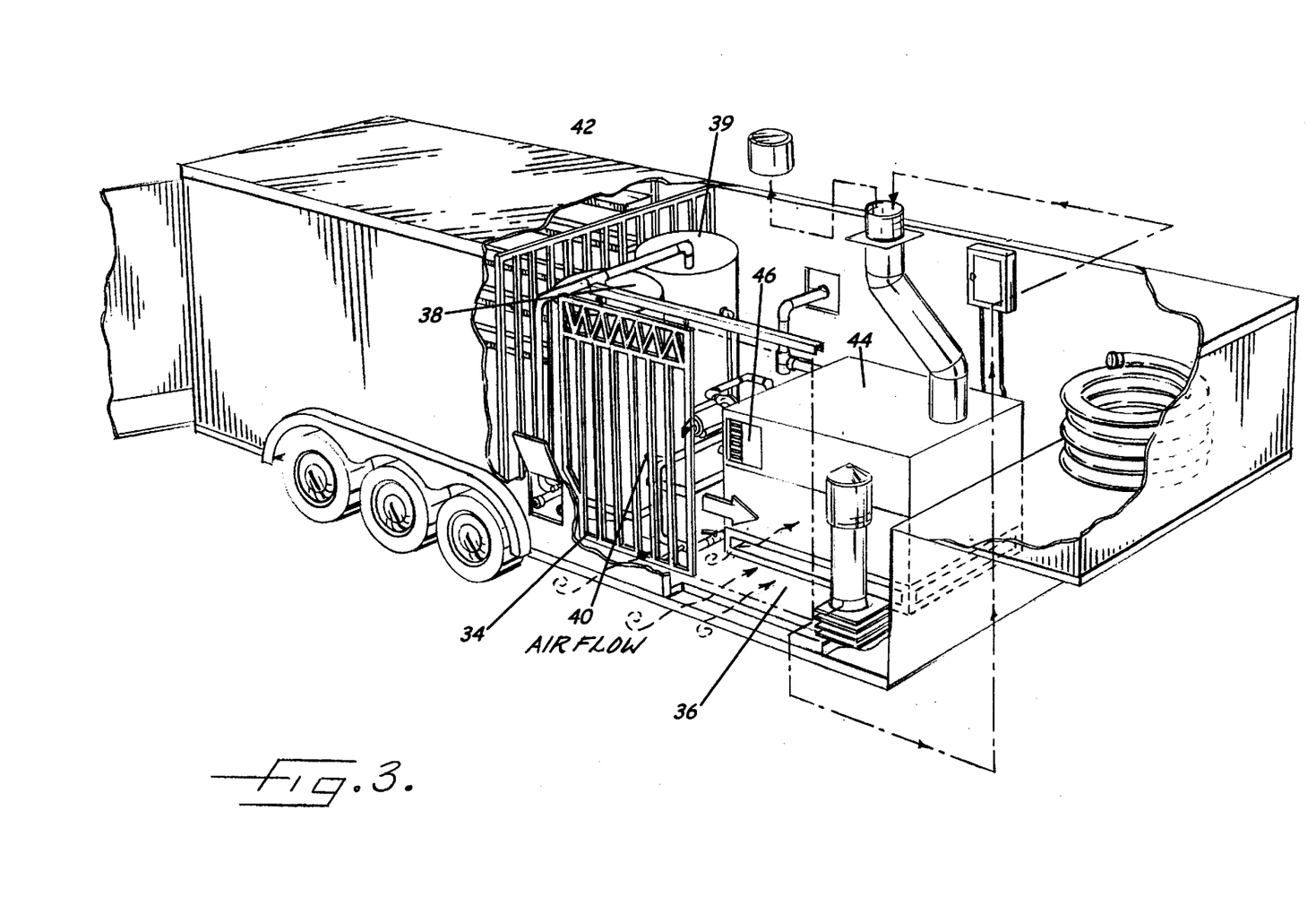
FIG. 3 is a fragmentary perspective view of a mobile water modifying system having portions broken away for clarity in illustrating a water modifier, a pump, two fluid chambers, and an air circulation unit according to the present invention.

The mobility of the water modifying system 20 is preferably provided by a mobile platform 30 upon which various components of the system are mounted for ready transport to and from a suitable site. More preferably, as illustrated in FIGS. 2 and 3, the mobile platform 30 comprises a multi-wheeled, enclosed trailer-type structure. The enclosure permits the system 20 to be optimally positioned without exposure to adverse weather conditions such as strong winds and rain that could otherwise reduce the operating efficiencies and life-expectancy of the system 20. The enclosed mobile platform 30 also reduces the risk of vandalism and theft. As shown in FIGS. 2 and 3, the enclosed mobile platform includes both an outer door 32 and inner door 34, each positioned on a side portion of the enclosure. The outer side door 32 preferably is a solid, hinged piece that is swung outwardly from the rest of the enclosure to provide access to the interior of the enclosure. (See FIG. 2.) The inner door 34, however, slides parallel to the side portion and is not solid but rather is formed as a frame preferably having parallel bars. (See FIG. 3.) This permits the outer door to remain open while the inner door is slid into a closed position and locked, thereby permitting air to ventilate the interior of the enclosure while precluding access to unauthorized personnel. As illustrated in FIG. 3, the enclosure serves the additional purpose of providing a work and storage area for supplementary paraphernalia. An additional ventilation system comprising a fan and ventilation conduits can be included within the enclosed mobile platform 30. These ventilation elements not only serve to maintain an optimal temperature for the operative components of the system 20, but also permit the enclosed mobile platform 30 to be used as an efficient equipment storage and work area.

FIGS. 2 and 3 also illustrate the various operative components of the mobile water modifying system 20. In particular, a water modifier 36 is positioned within the enclosure. Preferably, the water modifier 36 includes at least one fluid chamber 38. More preferably, the water modifier 36 comprises a plurality of at least two such fluid chambers 38, 39. The water modifier 36 further includes a fluid inlet 40 through which water is received into an at least one fluid chamber from the external water supply and a fluid outlet 42 through which water is conveyed from an at least one fluid chamber to the preconstructed facility. The water modifier 36 of the system 20 includes a distinct water processor 44 in fluid communication with at least one fluid chamber 38. The water processor 44 preferably is at least one of the following: a water cooler to cool water received from the external source, a water softener to soften water received from the external source, or a water filterer/decontaminator to remove or eliminate organic and non-organic contaminants from water received from the external source to make the water suitable for drinking and/or bathing so that it can be supplied to the facility on a temporary or emergency basis. More preferably, the water processor 44 is a water heater to heat water received from the external source for supplying the heated water to a preexisting facility.

Although preferably the water processor 44 serves as a water heater to heat water, it should be borne in mind throughout the description provided herein that the system 20 preferably permits different types of processors to be interchanged according to the particular need the system is employed to meet. Indeed, a particular advantage of the system 20 provided by the inclusion of at least one distinct fluid chamber 38, 39 is that the same system 20 can be used for different functions by interchanging the particular water processor employed as part of water modifier 36 used in the system 20.

The arrangement of at least two fluid chambers 38, 39 in fluid communication with a separate, discrete water processor 44 (e.g., water heater), permits water to be taken in rapidly from an external source once the system 20 is interconnected with an external water source as described in detail below. The first units of water received by the system 20 are then rapidly modified by the water processor 44 and either supplied directly to the facility or stored, preferably in the one or more fluid chambers of the system 20. It is anticipated that the rate at which water is demanded by facility users (e.g., office workers or hotel guests) is less than the rate at which is received from the external supply and modified by the system 20. If water demand at the facility exceeds the capacity of a single water modifier 36, the system 20 is suitably adapted such that the water modification capacity of the system 20 can be easily and efficiently increased by calling for another mobile platform 30 having an appropriate water modifier 36 that can be brought to the site and put in place to augment the capacity of the first. Indeed, any number of additional water modifying systems can be aggregated as needed to meet the water demand of a particular facility. The fluid chamber, and more preferably a plurality of fluid chambers 38, 39, coupled with the associated distinct water processor 36—supplemented as necessary by additional mobile units—thus provides a kind of on-site water modifying assembly line. Accordingly, the system 20 receives water diverted from an external source into at least one fluid chamber 38, 39, processes the water, and stores it in at least one fluid chamber 38, 39 to supply the water on-demand to residents, guests, or patrons of virtually any type of facility, especially a commercial facility such as an office building, apartment complex, hotel, motel, or restaurant.

As noted, the water processor 44, whether it is adapted to heat, cool, or modify water in some other manner (e.g., eliminate organic or non-organic contaminants), is preferably a separate component apart from the at the least one fluid chamber 38, 39 of the water modifier 36 of the system 20. In addition, the water processor 44 preferably also includes a signal processing unit and memory, as will be familiar to those skilled in the art. The inclusion of the elements allows the operation and functioning of the water processor 44 to be programmed as desired, as, for example by entering command instructions using a keypad 46 positioned on the water processor 44.

This arrangement and construction of the water modifier 36 provides particular advantages related to the speed and efficiency with which the system 20 is able to respond in an emergency situation to supply modified water from an external source to a preexisting facility. More specifically, the separate tanks can be coupled to a rapidly functioning processor so that the system 20 is able to respond rapidly in an emergency (e.g., failure of the on-site water heater at a hotel facility). In such event, the system 20 is quickly interposed using means and methods detailed herein into an existing water network. Water is received by the system 20 from an external source, rapidly processed by the processor 44, and stored in the at least one separate tanks 38. The rapidly processed and stored water is then available to meet the water demands of the facility occupants. Generally, for larger facilities (e.g., office building or hotel), the user demand will be time sensitive with "dump loads" occurring at regular intervals (e.g., hot water use in a hotel spikes during early morning hours when guests awaken and want to shower before dressing).

A system 20 according to the present invention is uniquely suited to meet these demands. For example, when the system 20 is employed to provide an emergency response to a breakdown in a large facility's water heater, the water modifying system 36 preferably includes a water processor 44 functioning as a water heater. More preferably, the water processor 44 is a water heating unit having at least a nine hundred ninety thousand BTU (990 kBTU) capacity such that is capable of heating enough water to supply a 300-unit building in a rapid time interval. Thus, in contrast to a conventional water heater, the water modifier 36 (i.e., heater) according to the present invention takes water into the at least one fluid chamber 38 and processes the water in the discrete water processor 44 with greater speed and efficiency. And, then, is able to supply that water so that a breakdown in the facility's water heater is at most a minor inconvenience and often one that will be unnoticed by facility occupants. This is a particularly valuable attribute in the context of servicing a commercial facility such as an office building, apartment complex, motel, hotel or restaurant.

As alluded to above, the speed and efficiency of the mobile water modifying system 20 is further enhanced by the unique manner in which the system 20 is rapidly interposed into an existing network 22 of water lines or pipes 26, 28. The network 22 into which the system 20 is interposed can be any network composed of water lines located at or extending between any preconstructed facility and an external water supply. Once interposed into a water line network 22, the system can divert water from the external source to the water modifier 36 for modification before supplying it to the facility. According to the steps detailed below, the system 20 is interconnected using at least a first connector 48 and second connector 50. The first connector 48 connects to the network 22 and connects via a first tube 52 to the inlet 40 of one of the at least one fluid chambers 38, 39. Accordingly, water is diverted from the external water supply to the water modifier 36 via the first connector 48 and first tube 52. A second connector 50 also connects to the water network and, via a second tube 54, to the water modifier 36. Once water diverted from the external source to the water modifier 36 connected to the water network 22 is modified, it then is supplied through a fluid outlet 42 of at least one fluid chamber 38, 39 to the facility via the second tube 54 and second connector 50.

The connectors of the system 20 include a first connector 48 having a first connector in-line hollow body portion 56 and a first connector cross-line hollow body portion 58 wherein the longitudinal direction of cross-line portion 58 is preferably angled at least forty five (45) degrees and, more preferably, at least ninety (90) degrees relative to the longitudinal direction of the in-line portion 56 of the first connector. The connectors preferably also include at least a second connector 50 having a second connector in-line hollow body portion 60 and a second connector cross-line hollow body portion 62 wherein the longitudinal direction of cross-line portion 62 is preferably angled at least forty five (45) degrees and, more preferably, at least ninety (90) degrees relative to the longitudinal direction of the in-line portion 60 of the second connector. As described below, the first and second connectors 48, 50 connect directly to the water lines or pipes of the existing water network 22. (See FIGS. 5–7.) Thus, as already noted, the connectors 48, 50 are able to redirect water from the water source to the water modifier 36 and from the water modifier 36 to the facility. Specifically, the first connector 48 connects to a first main line (e.g., cold water line) and redirects the water that ordinarily flows in an in-line direction via the first main line (e.g., cold water line) from the external water source to a facility water modifier (e.g., facility heater). The redirected water instead flows in a cross-line direction to the water modifier 36 of the system 20. The second connector 50 connects to a second main water line (e.g., hot water line) and redirects the water that ordinarily flows in an in-line direction via the second main water line (e.g., hot water line) from the facility water modifier (e.g., water heater) to the facility. The redirected water instead flows in a cross-line direction from the water modifier 36 of the system 20 to the facility after having been modified (e.g., heated).

Preferably, the first connector 48 has a first connector in-line inlet 64, a first in-line outlet 66, and a first connector cross-line outlet 68. Similarly, the second connector 50 preferably has a second connector in-line inlet 70, a second connector in-line outlet 72, and a second connector cross-line outlet 74. In-line inlet 64 and in-line outlet 66 of the first connector 48 each connect to separate portions of a water pipe or line as described below. The first connector cross-line outlet 68 connects to a first tube that connects, in turn, to a fluid inlet 40 of the water modifier 36 of the system 20. So, too, the in-line inlet 70 and in-line outlet 72 of the second connector 50 each connect to separate portions of a water pipe or line as also described below, and a second tube 54 connects to a fluid outlet 42 of the water modifier 36 of the system 20.

More preferably, the first connector 48 has three valves 65, 67, 69 corresponding respectively, to the in-line inlet 64, the in-line outlet 66, and the cross line outlet 68 and defining, accordingly, a first connector in-line inlet valve 65, a first connector in-line outlet valve 67, and a first connector cross-line valve 69. Each valve can be independently controlled so that water flow through the hollow body portions of the first connector 48 can be selectively directed to flow only through the in-line portion by closing the cross line outlet valve 69 with the others open, to flow only through the cross-line portion by closing the in-line outlet valve 67, or to flow through both the in-line and cross-line portions by opening each of the associated valves No water flows through the first connector 48 if all the valves are closed. Similarly, the second connector 50 has three valves 71, 73, 75 corresponding respectively, to the in-line inlet 70, the in-line outlet 72, and the cross line outlet 74 of the second connector 50. These three valves define, respectively, a second connector in-line inlet valve 71, a second connector in-line outlet valve 73, and a second connector cross-line valve 75. Again, each of the second connector valves also can be independently controlled. In the second connector 50, water is directed to flow only through the in-line portion by closing the cross line outlet valve 75 with the others open, to flow only through the cross-line portion by closing the in-line outlet valve 71, or to flow through both the in-line and cross-line portions by opening each of the associated valves. No water flows through the second connector 50 if all the valves are closed. The plurality of valves provide an efficient mechanism for controlling water pressure in the system as described below in connection with the description of the operation of the system.

Figure 4A:
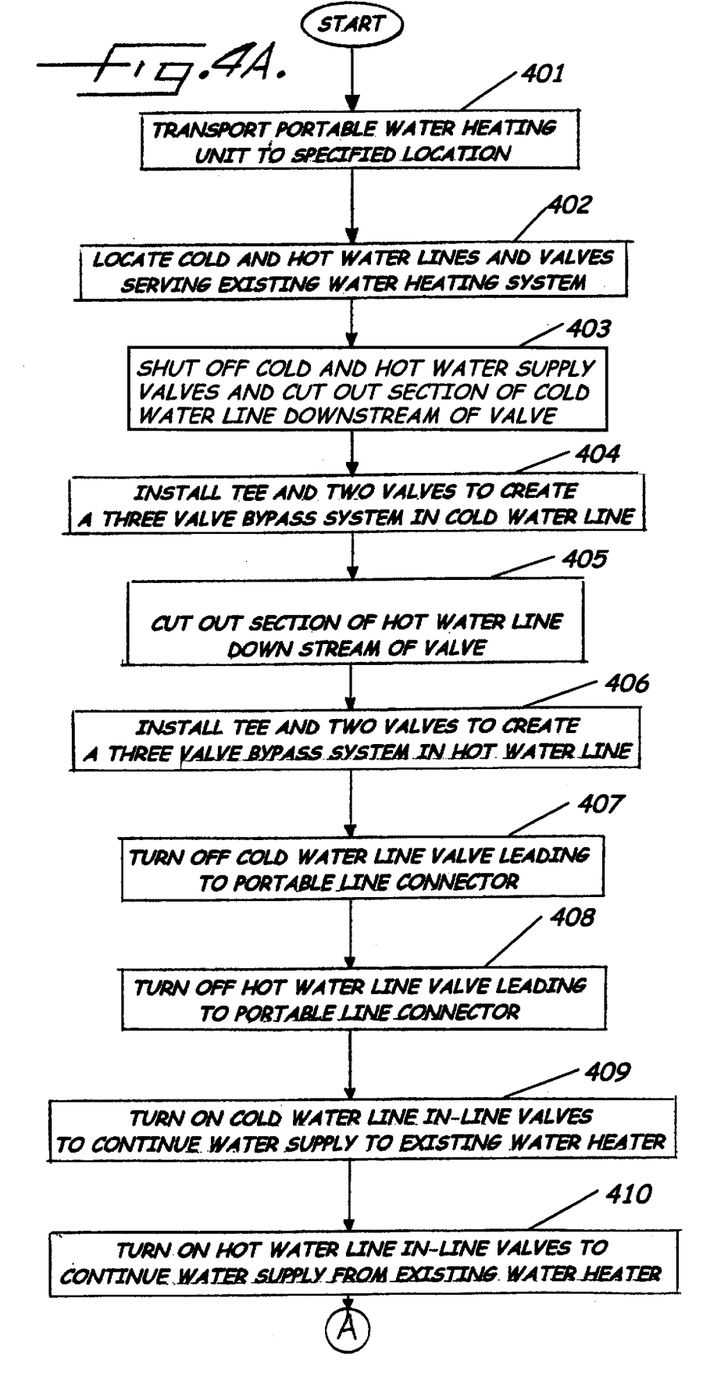
FIGS. 4A–C are schematic flow diagrams of a method of maintaining a supply of hot water to a facility during replacement of the facility water heater by temporarily diverting water to an external source, heating the water with a mobile water heater, and supplying the water to the facility according to the present invention.
Figure 4B:
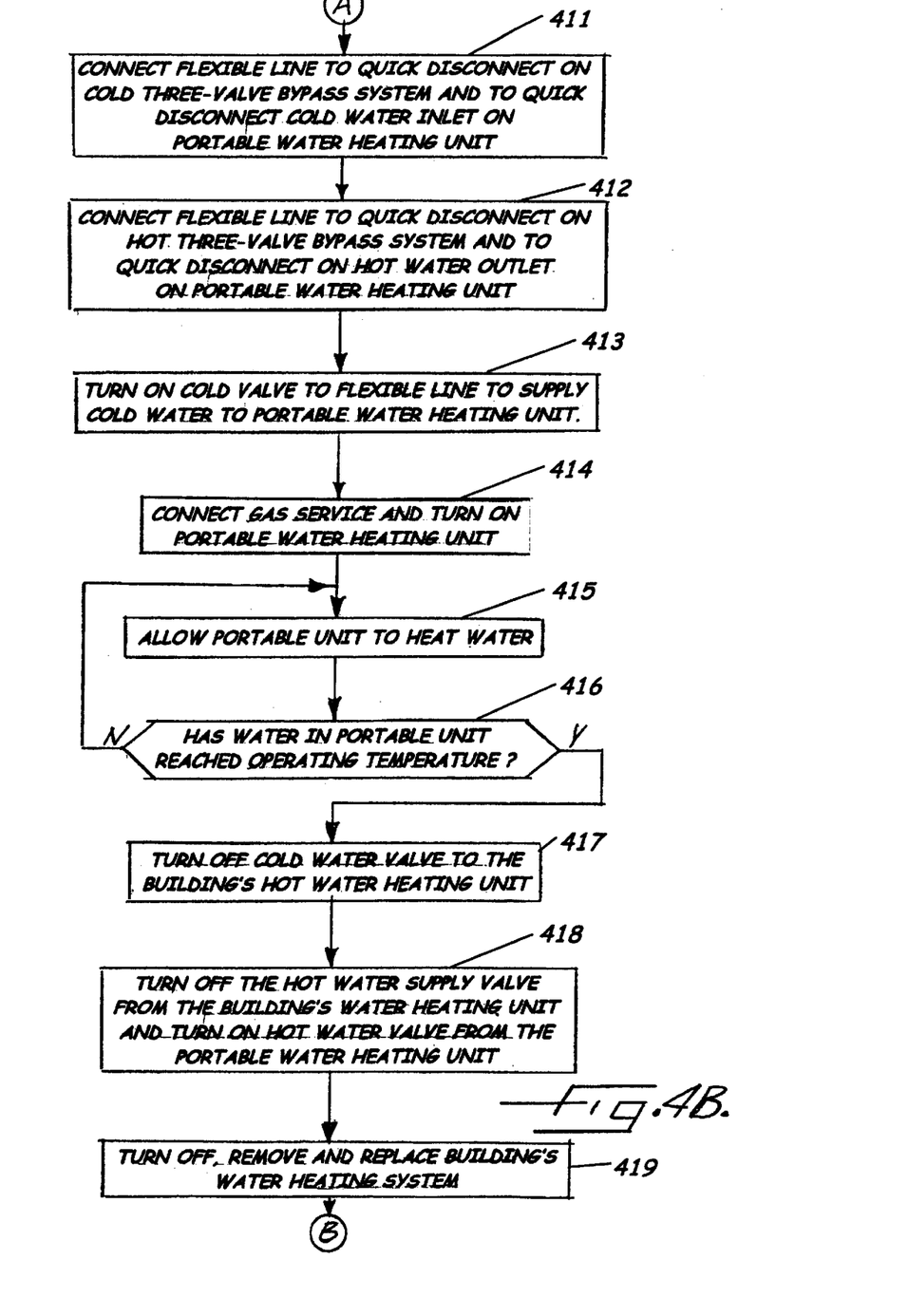
Figure 4C:
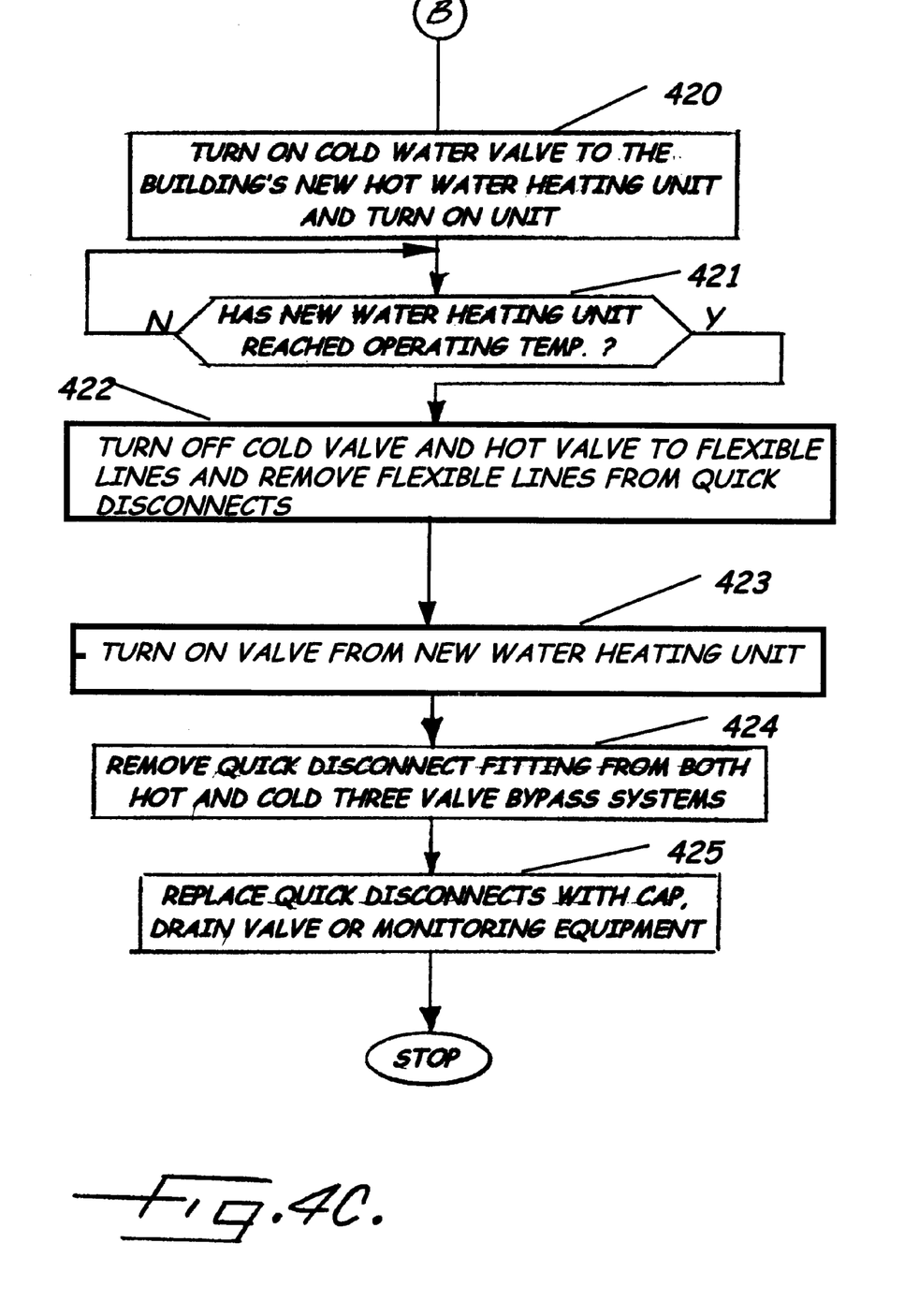

Again, although other problems can be addressed depending on the type of water processor employed with the system 20, the operative steps and mechanisms for the connecting the system with a pipe structure are described herein in the specific context of using the water modifying system to overcome an interruption in a facility's water supply due to breakdown of the facility's water heater. FIGS. 4A–4C illustrate the specific steps of interposing the system. The initial step is to transport the mobile water modifying system 20 including water modifier 36 having at least one fluid chamber 38, 39 and a distinct water processor 44 (water heater) to a convenient location where the system 20 can be coupled to the pipe structure or water network 22 associated with a facility. (Block 401.) Next, the cold and hot water lines 26, 28 extending between the facility's existing water heater and the external source are located as well as their control valves. (Block 402.) The cold and hot water supply lines are shut off and, with the water off, a section of the cold water line 26 is cut out. (Block 403.) A first connector is then installed where the pipe portion has been cut out. The first connector 48 is positioned so as to connect up the portions of pipe exposed when the removed section was cut out of the pipe structure 22. (Block 404.)

Figure 5:
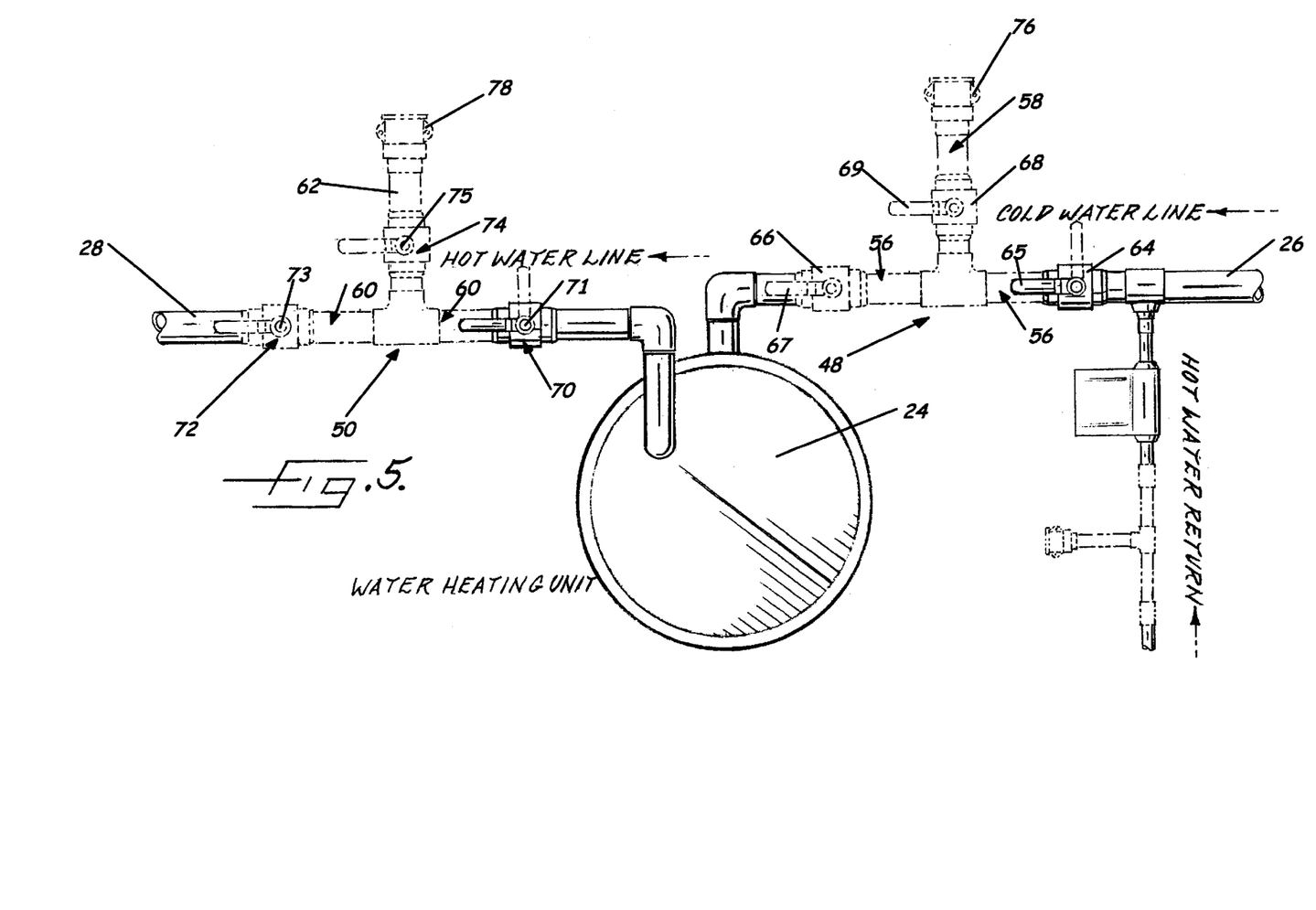
FIG. 5 is a top plan view of a pair of connectors connecting a water modifier of a mobile water modifying system to a pipe structure of a facility according to the present invention.

As illustrated in FIG. 5, the first connector 48 includes the in-line hollow portion having opposing open ends forming, respectively, the inlet 64 and the outlet 66. These ends connect, respectively, to the two open portions of pipe formed by removing a section of the cold water line pipe 26. As also described above, the connector also includes the hollow cross-line portion 58 in fluid communication with the in-line portion 56 extending outwardly from the in-line portion as described so that water flow can be redirected to the water modifier 36 after the first connector 48 is connected to the two portions of pipe.

After the first connector 48 is installed, the same steps are undertaken to interpose the second connector 50 into the corresponding hot water line 28 of the water network 22. The hot water supply line having been shut off, a section of the hot water line 28 is cut out of the network 22. (Block 405.) The second connector 50 is then installed where the pipe portion has been cut out. The second connector 50 is positioned so as to connect up the portions of pipe exposed where the removed section was cut out of the hot water line 28. (Block 406.) Like the first connector 48, the second connector 50, as already described, also preferably includes an in-line hollow portion 60 having opposing open ends that connect, respectively, to the two open portions of pipe formed by removing a section of the hot water line so that water modified by the water modifier 36 can be returned to the network 22 to supply modified water to the facility.

Figure 6:
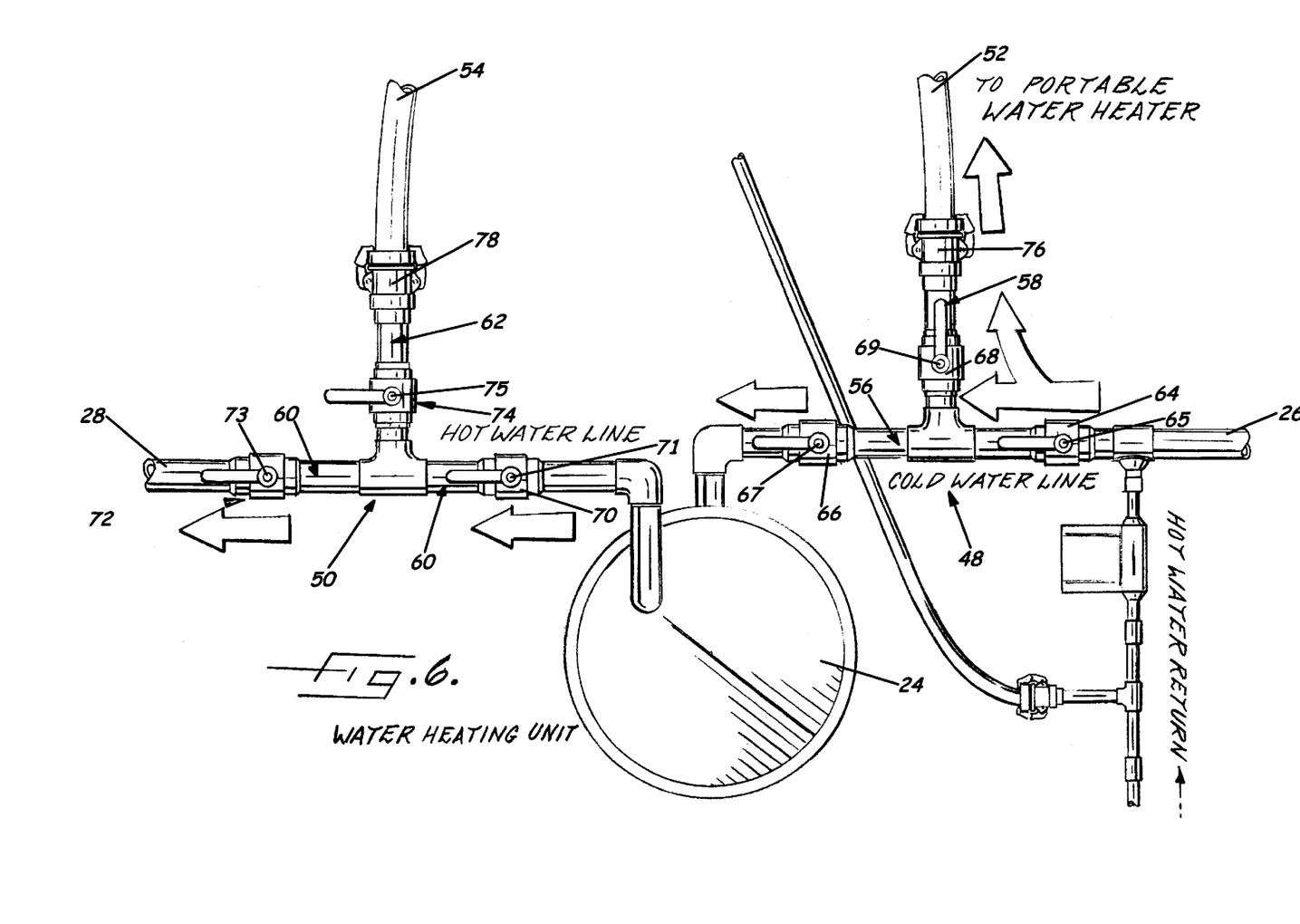
FIG. 6 is a top plan view of a pair of connectors connecting a water modifier of a mobile water modifying system to a pipe structure of a facility according to the present invention.
Figure 7:
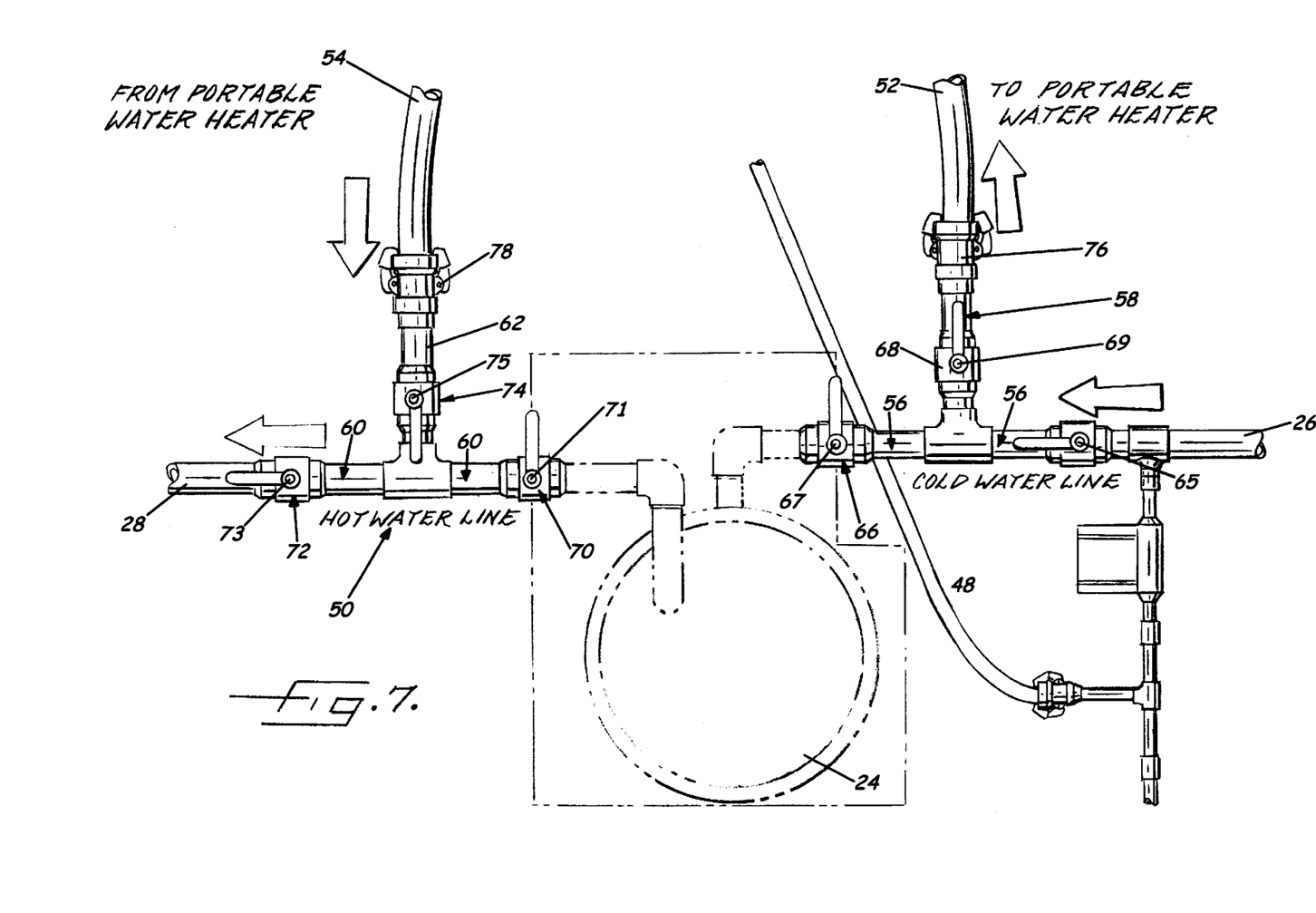
FIG. 7 is a top plan view of a pair of connectors connecting a water modifier of a mobile water modifying system to a pipe structure of a facility according to the present invention.
Figure 8:
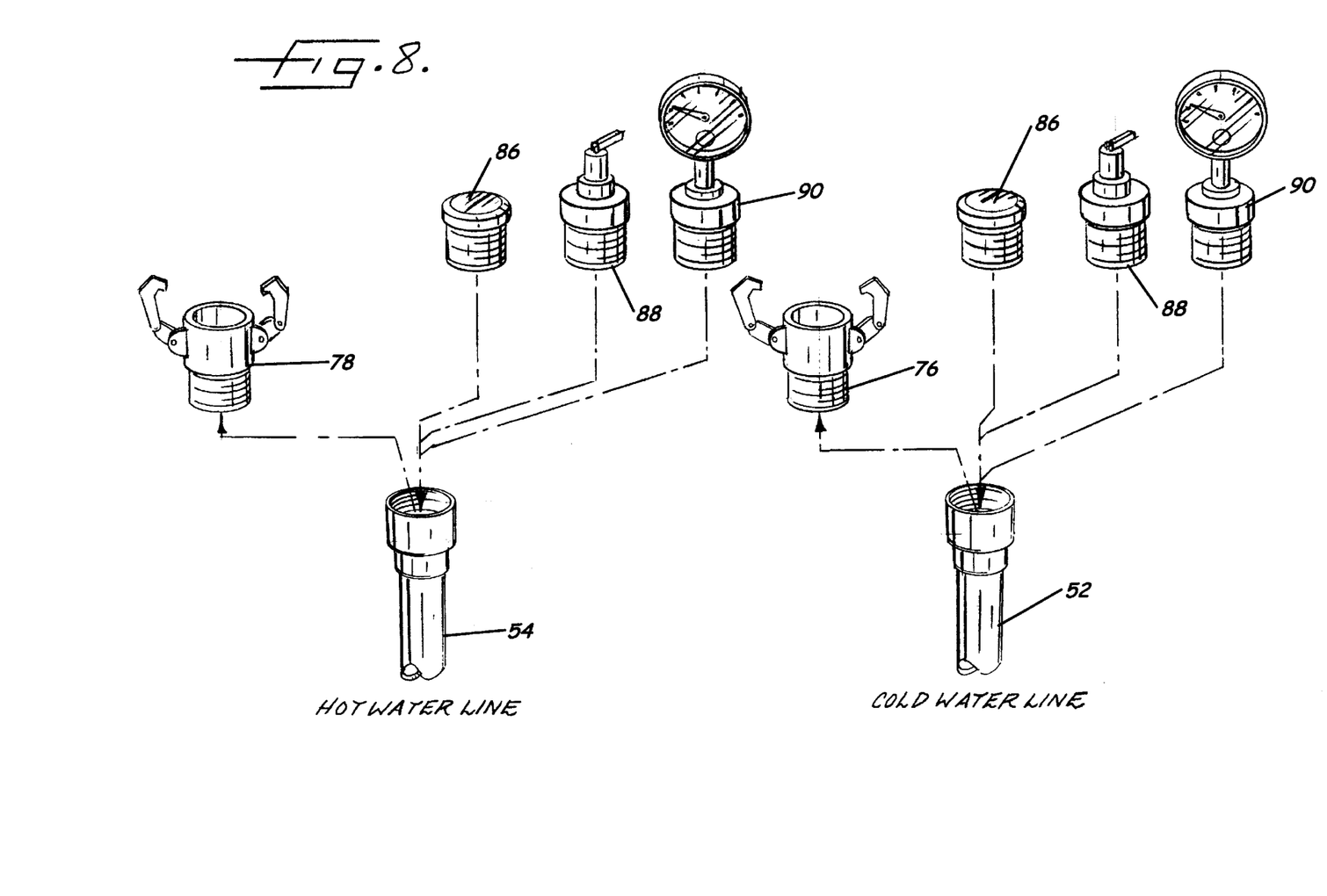
FIG. 8 is an exploded perspective view of a quick connect extension, cap, pressure release, and pressure gauge, each adapted to connect to the open end of the cross-line portion of a connector according to the present invention.

First and second tubes 52, 54 can be connected, respectively, to the outlets 68, 74 of the first and second cross-line portions 58, 62 of the first and second connectors 48, 50, respectively. These tubes also connect to the at least one fluid chamber of the system 38, 39. Thus, the tubes provide a fluid connection from the pipe sections where the first and second connectors 48, 50 are interposed to divert water to the water modifier 36 for modification before supplying it to the facility. Preferably, though, so as to avoid unnecessary pressure build up, once both the first and second connectors 48, 50 are interposed into the cold and hot water pipe lines, respectively, the valves 68, 74 of the hollow cross-line portions of each connector are closed. (Blocks 407 and 408.) Correspondingly, as illustrated in FIG. 5, the in-line inlet valve 65 and the in-line outlet valve 67 of the first connector are opened. So, too, the in-line inlet valve 71 and the in-line outlet valve 73 of the second connector 50 are opened. The cross-line outlet valves 69, 75 of both connectors remain closed. In this arrangement, the valves permit water to flow from the external source through the cold water line to the facility water heating unit and on through the hot water line thereby avoiding unnecessary buildup of water pressure. (Blocks 409 and 410.) With the water flowing in-line, the first tube 52 is connected to the first connector 48 and the second tube 54 is connected to the second connector 50. (Blocks 411 and 412.) As illustrated in FIGS. 6–8, the first and second tubes 52, 54 are preferably connected to the first and second connectors 48, 50, respectively, using quick connect/disconnects 76, 78 adapted to be positioned at the open ends of the cross-line portions 58, 62 of the first and second connectors 48, 50. The quick connect/disconnects 76, 78, as shown, provide a pair of hinged talons that hook over flanged ends of the first and second tubes 52, 54 for rapid connection and disconnection of the tubes to the respective connectors 48, 50 interposed into the pipe structure network 22. After the tubes have been connected, the valve at the open end 68 of the cross-line portion 58 of the first connector 48 is opened to permit the flow of water to the water modifier 36 (i.e., water heater) of the mobile water modifying system. (Block 413.) Contemporaneously, the water modifier is connected to a gas container that provides gas to power the water heater. (Block 414.) Preferably, according to the present invention, a separate liquid petroleum gas (LPG) container 80 will have been separately delivered to the site and positioned adjacent the mobile platform in order to provide a ready supply of gas to power the water heater. LPG containers can be delivered as needed to meet the fueling requirements of the system as it operates supplying heated water to the facility. As shown FIGS. 1–3, a gas line 82 extends from the enclosed mobile platform 30 to connect to the LPG container 80. Alternatively, however, gas canisters can be carried on the mobile platform to provide a source of fuel. Still further, power can be supplied by an electrically powered generator carried aboard the mobile platform. In the later case, the system includes a separate line 84 that can connect to an external electrical power source.

The water modifier 36 will continue to heat water diverted from the external water source to the water heater until the water reaches a preselected operating temperature. (Blocks 415 and 416.) As illustrated in FIG. 6, water will flow in-line from the external water source through the facility water heater 24 to the facility as well as to the water modifier 36 (heater) of the system 20 while the water is being initially heated. Once the water is heated to the preselected operating temperature, though, the in-line outlet valve 67 of the first in-line connector 48 is closed. (Block 417.) The in-line inlet valve 71 of the second in-line connector 50 is closed and the cross-line valve 75 is opened. (Block 418.) As illustrated in FIG. 7, at this point, then, water from the external source is flowing completely to the water heater of the system and through the second tube 54 and second connector 50 to the facility.

In operation, the system provides an optimal method of repairing or replacing the facility's faulty water heater. Specifically, with water now shunted away from the water heating unit to the water modifier 36 and directly onto the facility, the facility heating unit can easily be repaired or replaced altogether. (Block 419.) Once the facility's water heater has been repaired or replaced, the first connector in-line valve 67 is re-opened permitting water to flow from the external source to the newly repaired or replaced water heating unit. (Block 420). The cross-line outlet valve 69 of the first connector 48 is closed, and the first tube 52 connecting the water modifier to the first connector 48 is disconnected. Water is heated until it reaches a preselected operating temperature. (Block 421.) Once the desired temperature is reached, the second connector in-line valve 71 is re-opened permitting water to flow from the newly repaired or replaced water heater to the facility. The valves 69, 75 at the open ends of the cross-line portions 58, 62 of the first and second connectors 48, 50 are closed and the first and second tubes 52, 54 connecting the water modifier to the first and second connectors 48, 50 are disconnected. (Block 422.) With the valves at the open ends of the cross-line portions of both the first and second connectors 48, 50 closed, the quick connects 76, 78 can be removed from the respective open ends and each replaced by a cap 86, drain valve 88, or monitor (e.g. pressure gauge) 90 as the line from the newly replaced heater is opened (Blocks 423–425.)

FIG. 8 illustrates each of the cap 86, drain valve 88, and pressure cap 90. Accordingly, the first and second connectors 48, 50 are each left permanently in place interposed within the pipe structure extending between the external water source and the facility. There are distinct advantages to leaving these connectors in place, each capped with a cap 86, drain valve 88, or pressure gauge 90. The major advantage is that the facility now has a permanently positioned means for diverting water from the external source to a mobile water modifier. This precludes any interruption in the supply of hot water to the facility if the water heating unit of the facility must later, again, be turned off for repair or replacement.

FIGS. 1–8 further illustrate various method aspects of the present invention. According to the present invention, water supplied to a preconstructed facility from an external water supply can be modified by interconnecting a water modifier 36 to a water pipe structure network 22 linking the preconstructed facility to the external water supply. Water is then diverted from the water supply to the water modifier. The water so diverted is modified and then conveyed to the preconstructed facility. Moreover, interconnecting a water modifier 36 can be effected by stopping the flow of water from the external source, removing a section of the water pipe, and reconnecting the pipe by replacing the removed section thereof with a tube having at least one fluid path for diverting water to the water modifier 36.

In addition, the step of diverting water can be accomplished by inhibiting the in-line flow of water from the water source and directing the flow of water to the water modifier 36. Furthermore, modification of the water diverted from the water supply can include changing the temperature thereof so as to make the water hotter or colder. Modification of the water, moreover, can further include or alternatively comprise eliminating contaminates from the water. So modified, the water then can be conveyed to the preconstructed facility utilizing externally generated water pressure to cause water to flow from the water modifier 36 to the preconstructed facility.

The present invention also provides a efficient method of repairing a preconstructed facility water modifier. This method entails diverting water from an external water supply to a temporary water modifier 36 and modifying the water so diverted from the water supply using the temporary water modifier. The water, once modified, is then conveyed to the preconstructed facility. While water is being diverted, the preconstructed facility water modifier 36 can be repaired or replaced as needed. As described above, the diversion of water can be accomplished by interposing a plurality of connectors 48, 50 in a water network 22 connecting the facility and the external water supply. Accordingly, the plurality of connectors 48, 50 includes a first connector 48 that selectively directs water flow from the external water source to the temporary water modifier 36 along with a second connector 50 that selectively directs water flow from the temporary water modifier 36 to the preconstructed facility.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A mobile water modifying system adapted to be readily interposed into a water pipe structure extending between a preconstructed facility and an external water supply to thereby receive water from the water supply, modify the water, and transfer the modified water to the facility, the system comprising:

a mobile platform;

a water modifier positioned on the platform to modify water received from the external water supply, the water modifier having a fluid chamber, a fluid inlet through which water is received into the fluid chamber from the external water supply and a fluid outlet through which water is conveyed from the fluid chamber to the preconstructed facility;

a first connector comprising a first connector in-line hollow body portion having first and second ends each adapted to connect to a first main water line and a first connector cross-line hollow body portion in fluid communication with and extending outwardly from the first connector in-line hollow body portion, the first connector cross-line hollow body portion having an open distal end adapted to connect to a first tube;

a second connector comprising a second connector in-line hollow body portion having first and second ends adapted to connect to a second main water line and a second connector cross-line body portion in fluid communication with and extending outwardly from the second connector in-line hollow body portion, the second connector cross-line body portion having an open end adapted to connect to a second tube;

a first tube having a first end adapted to connect to the open end of the first connector cross-line hollow body portion of the first connector and a second end adapted to connect to the fluid inlet of the water modifier;

a second tube having a first end adapted to connect to the open end of the second connector crossline hollow body portion of the second. connector and a second end adapted to connect to the fluid outlet of the water modifier; and a motorized transporter associated with the mobile platform to transport the mobile platform between stationary locations.

2. A system as defined in claim 1, wherein each of the first and second connectors each further comprises a flow valve to regulate fluid flow through the first and second connector in-line body portions, respectively, and the first and second cross-line hollow body portions, respectively.

3. A system as defined in claim 2, wherein the flow valve comprises one of a plurality of flow valves.

4. A system as defined in claim 3, wherein the plurality of flow valves comprises an in-line inlet valve, an in-line outlet valve, and a cross-line valve.

5. A system as defined in claim 1, wherein the system is adapted to receive water from the external water supply and to convey water to the preconstructed facility under water pressure generated by the. external water supply such that the water pressure. causes water to flow from the external water supply source to the system and from the system to the preconstructed facility.

6. A system as defined in claim 1, wherein the system is adapted to receive water from the external water supply and to convey water to the preconstructed facility under water pressure generated in the water pipe structure such that the water pressure causes water to flow from the external water supply source to the system and from the system to the preconstructed facility.

7. A system as defined in claim 1, wherein the water modifier further comprises a water processor in fluid communication with the fluid chamber.

8. A system as defined in claim 7, wherein the water processor includes a programmable signal processing unit and memory.

9. A system as defined in claim 1, wherein the system further comprises a power source connector connected to the water modifier and adapted to connect to a power source external to the system to receive power therefrom to power the water modifier.

10. A system as defined in claim 1, wherein the system further comprises a power source adapted to connect to the water modifier to thereby supply power to the water modifier.

11. A system as defined in claim 1, wherein the system further comprises a water pump positioned on the mobile platform to draw water from the water supply to the system and to convey water from the system to the preconstructed facility.

12. A system as defined in claim 1, wherein the water modifier comprises a water heater to elevate the temperature of water received from the external water source.

13. A system as defined in claim 1, wherein the water modifier comprises at least one of a water cooler, a water softener, a water filter, and a water decontaminator.

14. A system as defined in claim 9, wherein the water modifier defines a first water modifier to perform a first water modification function and the system further includes a second water modifier that can be interchanged with the first water modifier to perform a second water modification function.

15. A mobile water modifying system adapted to be interposed between a preconstructed facility and an external water supply to thereby receive water from the water supply, modify the water, and transfer the modified water to the facility, the system comprising:
  a non-stationary water modifier to modify water received from the external water supply, the water modifier having a fluid chamber, a fluid inlet through which water is received into the fluid chamber from the external water supply and a fluid outlet through which water is conveyed from the fluid chamber to the preconstructed facility;
  a first connector comprising a first connector in-line hollow body portion having a first connector in-line inlet and a first connector in-line outlet each adapted to connect to a first main water line, a first connector in-line inlet valve, a first connector in-line outlet valve, and a first connector cross-line hollow body portion in fluid communication with and extending outwardly from the first connector in-line hollow body portion, the first connector cross-line hollow body portion having an open distal end defining a first connector cross-line outlet adapted to connect to a first tube and a first connector cross-line outlet valve;
  a second connector comprising a second connector in-line hollow body portion having a second connector in-line inlet and a second connector in-line outlet each adapted to connect to a second main water line, a second connector in-line inlet valve, a second connector in-line outlet valve, and a second connector cross-line hollow body portion in fluid communication with and extending outwardly from the first connector in-line hollow body portion, the second connector cross-line hollow body portion having an open distal end defining a second connector cross-line outlet adapted to connect to a second tube and a second connector cross-line outlet valve;
  a first tube having a first end adapted to connect to the first connector cross-line outlet and a second end adapted to connect to the fluid inlet of the water modifier; and
  a second tube having a first end adapted to connect to the second connector cross-line outlet and a second end adapted to connect to the fluid outlet of the water. modifier.

16. A system as defined in claim 15, wherein the fluid chamber of the water modifier comprises one of a plurality of fluid chambers.

17. A system as defined in claim 16, wherein the water modifier further comprises a water processor in fluid communication with the fluid chamber.

18. A system as defined in claim 17, wherein the water processor includes a programmable signal processing unit and memory.

19. A system as defined in claim 15, wherein the system further comprises a power source connector connected to the water modifier and adapted to connect to a power source external to the system to receive power therefrom to power the water modifier.

20. A system as defined in claim 15, wherein the system further comprises a power source adapted to connect to the water modifier to thereby supply power to the water modifier.

21. A system as defined in claim 15, wherein the system further comprises a water pump positioned on the mobile platform to draw water from the water supply to the system and to convey water from the system to the preconstructed facility.

22. A system as defined in claim 15, wherein the system is adapted to receive water from the external water supply and to convey water to the preconstructed facility under water pressure generated by the external water supply such that the water pressure causes water to flow from the external water supply source to the system and from the system to the preconstructed facility.

23. A system as defined in claim 15, wherein the system is adapted to receive water from the external water supply and to convey water to the preconstructed facility under water pressure generated in the water pipe structure such that the water pressure causes water to flow from the external water supply source to the system and from the system to the preconstructed facility.

24. A system as defined in claim 15, wherein the water modifier comprises a water heater to elevate the temperature of water received from the external water source.

25. A system as defined in claim 15, wherein the water modifier comprises at least one of a water cooler, a water softener, a water filter, and a water decontaminator.

26. A system as defined in claim 15, wherein the water modifier defines a first water modifier to perform a first water modification function and the system further includes a second water modifier that can be interchanged with the first water modifier to perform a second water modification function.

27. A method of modifying water supplied to a preconstructed facility from an external water supply, the method comprising:
  interconnecting a water modifier to a water pipe structure linking a preconstructed facility to an external water supply;
  diverting water from the water supply to the water modifier;
  modifying the water diverted from the water supply; and
  conveying the modified water to the preconstructed facility.

28. A method as defined in claim 27, wherein the step of interconnecting a water modifier comprises stopping the flow of water from the external source, removing a section of the water pipe, and reconnecting the pipe by replacing the removed section thereof with a tube having at least one fluid path for diverting water to the water modifier.

29. A method as defined in claim 28, wherein the step of diverting water comprises inhibiting the in-line flow of water from the water source and directing the flow of water to the water modifier.

30. A method as defined in claim 29, wherein the step of modifying the water diverted from the water supply comprises changing the temperature thereof.

31. A method as defined in claim 30, wherein the step of modifying the water diverted from the water supply comprises eliminating contaminates from the water.

32. A method as defined in claim 31, wherein the step of conveying the modified water to the preconstructed facility comprises utilizing externally generated water pressure to cause water to flow from the water modifier to the preconstructed facility.

33. A method of repairing a preconstructed facility water modifier, the method comprising:

diverting water from an external water supply to a temporary water modifier;

modifying the water diverted from the water supply using the temporary water modifier;

conveying the modified water to the preconstructed facility; and repairing the preconstructed facility water modifier when water from the external water supply is being diverted.

34. A method as defined in claim 33, wherein the step of diverting water comprises interposing a plurality of connectors in a water network connecting the facility and the external water supply.

35. A method as defined in claim 34, wherein the plurality of connectors comprises a first connector that selectively directs water flow from the external water source to the temporary water modifier and a second connector that selectively directs water flow from the temporary water modifier to the preconstructed facility.

36. A method of responding to a breakdown in a commercial facility water heater positioned to supply hot water to a commercial facility, the method comprising:

transporting a mobile water heating system positioned on a mobile platform to a location such that the mobile water heating system can be connected to a cold water line and a hot water line, the cold water line connecting the commercial facility water heater to a water source, the hot water line connecting the commercial facility water heater to at least one water pipe associated with the commercial facility, and the water heating system having at least one water storage tank and a water heater, and the preselected location so that the mobile water heating;

removing a selected portion of the cold water line;

connecting a first connector to the cold water line where the selected portion of the cold water line has been removed, the first connector adapted to connect a first tube to the cold water line and having at least one first connector valve to direct the direction of water flow through the first connector, and the first tube adapted to connect to the mobile water heating system in order to transport water to the mobile water heating system;

removing a selected portion of the hot water line;

connecting a second connector to the hot water line where the selected portion of the hot water line has been removed, the second connector adapted to connect a second tube to the hot water line and having at least one second connector valve to direct the direction of water flow through the second connector, and the second tube adapted to connect to the mobile water heating system in order to transport water from the mobile water heating system;

using the at least one first connector valve and the at least one second connector valve to divert water from the water source to the mobile water heating system and redirect the water to the facility once it has been heated to a preselected temperature;

repairing the facility water heater as water is diverted to the mobile water heating system, heated, and redirected to the facility; and disconnecting the first and second tubes after the facility water heater has been repaired and leaving in place the first and second connectors such that the first and second connectors can be reused in the event of a subsequent breakdown in the facility water heater.

37. A method as defined in claim 36, wherein repairing the facility water heater further comprises replacing at least one component of the facility water heater as water is diverted from the water source to the mobile water heating system, heated, and redirected to the facility.

* * * * *